US008401370B2

(12) United States Patent  
Dougherty et al.

(10) Patent No.: US 8,401,370 B2  
(45) Date of Patent: Mar. 19, 2013

(54) APPLICATION TRACKS IN AUDIO/VIDEO CONTAINERS

(75) Inventors: James Dougherty, Morgan Hill, CA (US); Thomas Zato, Santa Clara, CA (US); Gianluca Filippini, Los Gatos, CA (US); Reinhard R Steffens, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 164 days.

(21) Appl. No.: 13/041,362

(22) Filed: Mar. 5, 2011
(Under 37 CFR 1.47)

(65) Prior Publication Data

US 2011/0222835 A1    Sep. 15, 2011

Related U.S. Application Data

(60) Provisional application No. 61/311,959, filed on Mar. 9, 2010.

(51) Int. Cl.
*H04N 9/80* (2006.01)
(52) U.S. Cl. ........................................ 386/248
(58) Field of Classification Search .................. None
See application file for complete search history.

(56) References Cited

U.S. PATENT DOCUMENTS

| | | | |
|---|---|---|---|
| 5,475,835 A | 12/1995 | Hickey | |
| 5,822,537 A | 10/1998 | Katseff | |
| 5,889,515 A | 3/1999 | McDade | |
| 6,704,750 B2 | 3/2004 | Asazu | |
| 7,028,252 B1 | 4/2006 | Baru | |
| 7,069,296 B2 | 6/2006 | Moller et al. | |
| 2002/0095679 A1* | 7/2002 | Bonini | 725/74 |
| 2003/0093564 A1* | 5/2003 | Portuesi | 709/245 |
| 2004/0068583 A1 | 4/2004 | Monroe | |
| 2004/0158676 A1 | 8/2004 | Kasmirsky | |
| 2004/0158875 A1 | 8/2004 | Van Der Meulen | |
| 2004/0210480 A1* | 10/2004 | Muller | 705/14 |
| 2004/0240541 A1 | 12/2004 | Chadwick | |
| 2004/0264931 A1* | 12/2004 | Nakashika et al. | 386/95 |
| 2005/0177626 A1 | 8/2005 | Freiburg | |
| 2005/0193408 A1 | 9/2005 | Sull | |
| 2006/0098937 A1 | 5/2006 | Bruls | |
| 2006/0152504 A1 | 7/2006 | Levy | |
| 2007/0002947 A1* | 1/2007 | Lu et al. | 375/240.12 |
| 2007/0106419 A1 | 5/2007 | Rachamadugu | |
| 2007/0162817 A1* | 7/2007 | Hamada | 714/755 |

(Continued)

OTHER PUBLICATIONS

Wu, et al., "An Interactive and Team Approach to Multimedia Design Curriculum" (DSP Educatiion) IEEE Signal Processing Magazine Nov. 2005.

(Continued)

*Primary Examiner* — Thai Tran
*Assistant Examiner* — Sunghyoun Park

(57) ABSTRACT

Techniques for providing application tracks in a media data container are described. An application descriptor may be extracted from a coded bitstream. The coded bitstream comprises media data to be played by a media presentation system. The application descriptor identifies an application archive (i) that is retrievable by the media presentation system from one or more sources and (ii) that is required by the media presentation system at a set media time associated with the media data. While playing the media data, the media presentation system causes retrieving all of the application archive from the one or more sources before the set media time.

23 Claims, 8 Drawing Sheets

```
extract an application descriptor from a
coded bitstream, the coded bitstream
comprising media data to be played by
a media presentation system, and the
application descriptor identifying an
application archive (i) that is retrievable
by the media presentation system from
one or more sources and (ii) that is
required by the media presentation
system at a set media time associated
with the media data  410
```

```
while the media presentation system
playing the media data, causing the
media presentation system to retrieve
all of the application archive from the
one or more sources before the set
media time  420
```

U.S. PATENT DOCUMENTS

| | | | |
|---|---|---|---|
| 2007/0260476 A1 | 11/2007 | Smolen | |
| 2008/0069350 A1* | 3/2008 | Reinoso et al. | 380/200 |
| 2008/0126219 A1 | 5/2008 | Hengel | |
| 2008/0168098 A1 | 7/2008 | Paul | |
| 2008/0285572 A1 | 11/2008 | Diab | |
| 2008/0292270 A1* | 11/2008 | Ikeda | 386/95 |
| 2008/0304811 A1* | 12/2008 | Ikeda et al. | 386/95 |
| 2009/0034931 A1 | 2/2009 | Stone | |
| 2009/0113406 A1* | 4/2009 | Bandaram et al. | 717/166 |
| 2009/0133062 A1* | 5/2009 | Park et al. | 725/39 |
| 2011/0145840 A1* | 6/2011 | Kristensson et al. | 719/328 |

OTHER PUBLICATIONS

Carl Fleischhauer, "Audio-Visual Archiving Comparing Memory Institutions and Commercial Industries" iPRES-Oct. 9, 2006, vol. 22, Issue: 6, pp. 14-19.

Lam Wei Long, "Performance Evaluation of Compression Techniques on Scientific DataSet" pp. 1-132, 2006.

* cited by examiner

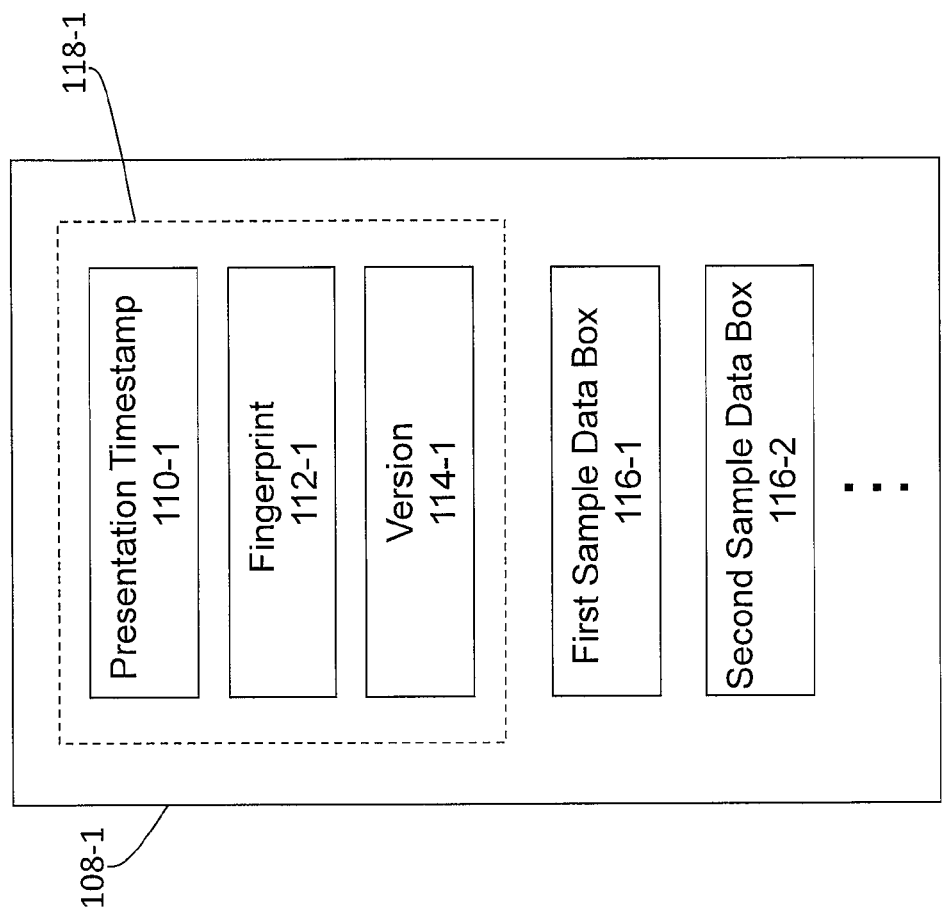

extract an application descriptor from a coded bitstream, the coded bitstream comprising media data to be played by a media presentation system, and the application descriptor identifying an application archive (i) that is retrievable by the media presentation system from one or more sources and (ii) that is required by the media presentation system at a set media time associated with the media data 410 while the media presentation system playing the media data, causing the media presentation system to retrieve all of the application archive from the one or more sources before the set media time 420

FIG. 4

APPLICATION TRACKS IN AUDIO/VIDEO CONTAINERS

CROSS REFERENCE TO RELATED APPLICATIONS

This application claims priority to U.S. Provisional Patent Application No. 61/311,959 filed 9 Mar. 2010, hereby incorporated by reference in its entirety.

TECHNOLOGY

The present invention relates generally to multimedia systems, and in particular, to multimedia presentation systems.

BACKGROUND

An interesting character, place, or piece of history, may inspire many depictions in a variety of media content. Take a museum as an example. The museum can be used as a setting in a movie, or described in depth in educational documentaries, or intertwined with famous patrons and collectors, or critically analyzed by art historians in various articles. The media materials concerning the museum may be innumerable, scattered about in audio, video, paper, electronic, and other forms. When a movie scene that depicts the museum is shown, a viewer may be inspired to explore further information relating to the museum. However, it is difficult to package a large variety of media content about the museum in a single medium even if a large volume medium such as a Blu-ray disc is used, and to present relevant media content timely while a viewer is watching the movie. Typically, a viewer with an inquiring mind needs to conscientiously and attentively gather sufficient information, while watching the movie, about a subject appearing in the movie, in order to be able to conduct a productive offline research about that subject later.

Under some approaches, a hyperlink may be presented during a scene of a movie. A viewer may initiate an information gathering session by clicking the hyperlink to cause additional information about a subject depicted by the scene to be retrieved from a data repository or a search engine. The movie can be streamed at the same time using the same network connection while the additional information is being retrieved. While the additional information is being downloaded, a movie playing program may not be able to secure a high enough bit rate commensurate with a desired rendering quality for the movie. Momentary pauses in playing the movie may occur. Alternatively, the movie playing program may adapt to a lower bit rate for movie streaming, resulting in a relatively low rendering quality for the movie.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1A, FIG. 1B, FIG. 1C, FIG. 1D, and FIG. 1E illustrate example media and application data components in application tracks, according to possible embodiments of the present invention;

FIG. 4 illustrates an example process flow, according to a possible embodiment of the present invention.

DESCRIPTION OF EXAMPLE POSSIBLE EMBODIMENTS

Figure 1B:
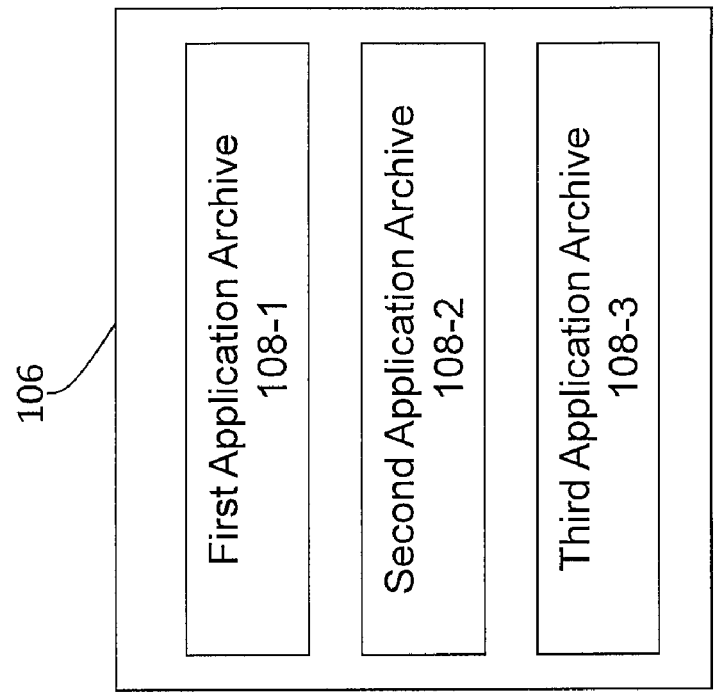

Example possible embodiments, which relate to providing application tracks in audio/video containers, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline (outline section headings are for reference purposes only and shall not in any way control the scope of the present invention):

1. GENERAL OVERVIEW
2. CONTAINERS AND MEDIA DATA
3. APPLICATION ARCHIVES
4. APPLICATION ARCHIVE STRUCTURE
5. APPLICATION DATA FROM A LOCAL SOURCE
    5.1. APPLICATION DATA IN JAR FILES
    5.2. APPLICATION DATA IN ZIP FILES
6. APPLICATION DATA AS ACCESSIBLE RESOURCES
7. APPLICATIONS ASSOCIATED WITH APPLICATION ARCHIVES
8. APPLICATION RENDERING SEQUENCE
9. MEDIA PRESENTATION SYSTEM
10. APPLICATION RENDERING SUBSYSTEM
11. SCHEDULE RETRIEVING APPLICATION ARCHIVES
12. ADDITIONAL AND/OR OPTIONAL FEATURES
13. PROCESS FLOW
14. IMPLEMENTATION MECHANISMS - HARDWARE OVERVIEW
15. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

In embodiments of the present invention, various types of application archives may be retrieved from a coded bitstream and/or other sources by a media presentation system that is streaming and/or playing media data from the coded bitstream. In a possible embodiment, an application archive may be packaged inside the same coded bitstream that provides the media data consumed by the media presentation system. In other possible embodiments, an application archive may be sourced from different sources in addition to or in place of the coded bitstream. For example, the coded bitstream may contain only an application descriptor for the application archive. If that is the case, the application archive may be retrieved entirely from other sources, which are identified in an application descriptor embedded in the coded bitstream. Application descriptors that identify sources from which application archives may be retrieved or downloaded may be embedded in and extracted from the coded bitstream.

Application archives may be used for a variety of purposes. For example, an application archive may provide additional multimedia information about a subject such as a museum depicted in the media data (which, for example, is that of a movie shown by the media presentation system). An application archive may also provide other types of data that can be consumed or used by the media presentation system. The ability to provide application archives along with media data in a coded bitstream is highly useful in situations in which a large number of media players may only be provisioned with very limited interface capabilities to accept application data other than that of media data types (e.g., music or movie in certain formats) that the media players support. For example, in a possible embodiment, an application archive may carry a new operating system that can be installed on the media presentation system. Similarly, an application archive may carry a firmware upgrade to fix problems discovered after the media presentation system has been delivered to an end user. An application archive may also carry one or more new or updated applications, games, and functions to be installed on the media presentation system.

An application archive as described herein may be a file, compressed or uncompressed. In a possible embodiment, a lossless compression algorithm may be used to produce an application archive with a smaller size than otherwise. In various possible embodiments, an application archive may comprise one or more applications and/or application data used by one or more applications. Any of these applications may be provided in the application archive, from other sources, or already installed in the media presentation system.

In a possible embodiment, the media presentation system is configured to schedule and retrieve an application archive in a timely manner that does not adversely impact high-quality rendering of the media data in the coded bitstream. An application descriptor may be embedded in the coded bitstream, comprising a timestamp to inform the media presentation system when the retrieval of an application archive should be finished. In turn, the media presentation system monitors resource usages on the media presentation system, including resource usages for carrying out the high-quality rendering of the media data. The media presentation system may divide the entire retrieval of an application archive in several contiguous or non-contiguous time intervals in which the resource usages are determined and/or predicted to be below a preconfigured safety threshold value.

To avoid repeated retrievals of a same application archival, the media presentation system may store application archives that have been retrieved from the coded bitstream and/or other sources in an application archive cache, for example, searchable by using fingerprints that are uniquely associated with the application archives. The application archives may be retained by the media presentation system until a time of expiration or until a cache management algorithm—such as the least-recently-used algorithm—determines as appropriate. Before retrieving an application archive, the media presentation system may extract a fingerprint for the application archive, for example, passed in from an application descriptor in the coded bitstream. The media presentation system may, based on the fingerprint for the application archive, determine whether the application archive is already in the cache and act differently based on the outcome of this determination.

In some embodiments, techniques as described herein may be implemented as methods performed by one or more computing devices. In some embodiments, mechanisms such as the media presentation system as described herein form a part of a multimedia system, including but not limited to a server, studio system, art director system, image editor, animation system, movie studio system, broadcast system, media recording device, media playing device, television, laptop computer, netbook computer, cellular radiotelephone, electronic book reader, point of sale terminal, desktop computer, computer workstation, computer kiosk, and various other kinds of terminals and display units.

Various modifications to the preferred embodiments and the generic principles and features described herein will be readily apparent to those skilled in the art. Thus, the disclosure is not intended to be limited to the possible embodiments shown, but is to be accorded the widest scope consistent with the principles and features described herein.

2. Containers and Media Data

Media data may be described herein with reference to one or more example media, including soundtracks, still images, video frames, slide shows, etc. The selection of an example medium in this description may be made for simplicity and concise unity and, unless expressly stated to the contrary, should not be construed as limiting a possible embodiment to a particular medium as embodiments of the present invention are well suited to function with any media content.

Figure 1A:
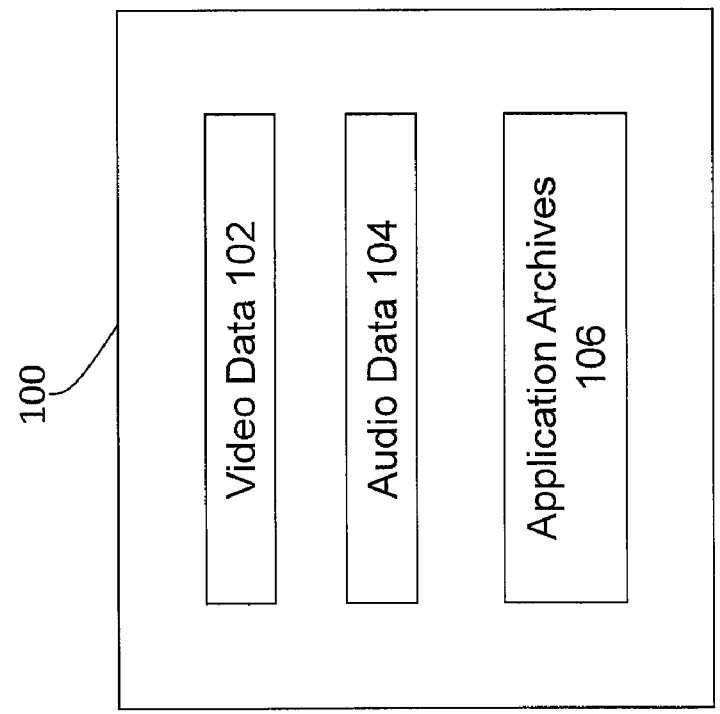

FIG. 1A shows an example of an audio/video container (100) that contains one or more application tracks in accordance with one or more possible embodiments. In a possible embodiment, the container (100) generally represents a logical structure that comprises various data blocks, data boxes, sample data entries that may be provided in a coded bitstream to a media presentation system. As used herein, the term "logical structure" refers to a conceptual structure in a media file or a coded bitstream, for example, defined and implemented by way of pointers and references in compliance with syntactic and semantic rules of a proprietary or standard-based format governing the media file or the coded bitstream; the conceptual structure may, but needs not, be the same as a physical layout of elements contained in the conceptual structure. The term "data box" refers to a sub-container in the logical structure.

For the purpose of illustration, the container (100) may be a base media file in an MP4 file format as defined by the ISO-IEC 14492:12 (ISO Base Media format). The container (100) provides a carriage of audio/video and other assets in an MP4 file. However, it should be noted that this invention is not limited to the MP4 file format. Other suitable media file formats may also be used in embodiments of the invention. For example, the container (100) may be a media file in a format as defined by the ISO-IEC 13818:1 (MPEG-2 Systems), another suitable format.

In a possible embodiment, the container (100) may comprise data boxes that are used to carry audio data (104), video data (102) and application archives (106), as illustrated in FIG. 1A.

In a possible embodiment, the video data (102) corresponds to any image data. The video data (102) may include one or more digital photographs, a set of digital images, a set of slides, a video segment, a movie, one or more game scenes, etc. The video data may comprise image frames captured by cameras, or synthesized on computer systems. The image frames may present 2-dimensional, 3-dimensional, or multi-view images to a viewer.

In a possible embodiment, the audio data (104) corresponds to any sound data. The audio data (104) may comprise audio signals captured by sensors, condensers, or synthesized on computer systems. The audio data (104) may be played either independently or in synchronization with the video data to generate mono, stereo, surround, or multi-channel sounds in a media presentation system.

In a possible embodiment, the container (100) is a base media file that has syntactic elements such as descriptors, atoms or data boxes which when parsed can be used to reconstruct the video data (102) and the audio data (104) that correspond to one or more original audio/video tracks. The video data (102) and the audio data (104) may be processed as ephemeral/non-persistent chunks, blocks, packets or streams of data which are fed to the video and decoder subsystems for displaying or rendering.

In a possible embodiment, the video data (102) may comprise logical data units such as image frames that are assigned individual presentation timestamps (PTSs). Similarly, the audio data (104) may comprise logical data units such as audio data samples that are assigned individual PTSs. Thus, the media presentation system may synchronize the playing of the video data (102) with the playing of the audio data (104).

3. Application Archives

In a possible embodiment, the application archives (106) generally represents one or more metadata tracks (more specifically, "application tracks") that are separate from media data tracks that carry the video data (102) and the audio data (104).

The application archives (106) may generally comprise one or more individual application archives. For the purpose of illustration only, the application archives (106) may comprise a first application archive (108-1), a second application archive (108-2), and a third application archive (108-3). The application tracks that carry these application archives may comprise corresponding PTS values associated with the application archives such that audio, video and applications can all be presented or rendered for a viewer at appropriate media times. As used herein, the term "media time" may refer to a media time point in a sequence of media time points that make up the total playing time of the media data. For example, if the media data represents a movie, a media time of the media data may be a media time point in the sequence of media time points that make up the two-hour playing time of the movie. While the media data may be played, paused, stopped, rewound, and fast-forwarded arbitrarily in real time, the total playing time, or the sequence of media time points, of the media data is an intrinsic property of the image data.

4. Application Archive Structure

FIG. 1C illustrates an example logical structure of an example application archive (108-1) in a possible embodiment of the invention. As shown, the application archive (108-1) comprises an application descriptor (118-1) and a set of sample data (e.g., 116-1, 116-2, etc.). It should be noted that this application archive structure is logical because any of the data in the structure may, but not required to, be physically proximate to each other in the application tracks carried by the container (100). As noted, in some embodiments, pointers and references in some data boxes in the container (100) may be used to define this logical structure. The data pointed to or referenced by the pointers and references may be located in other data boxes in the container (100) different from the data boxes that store the pointers and references. In some embodiments, a part or a whole of the application descriptor (118-1) may appear at the head of the coded bitstream, or in the middle of the coded bitstream, or be repeated at two or more locations in the coded bitstream.

In a possible embodiment, the application descriptor (118-1) comprises a number of data items. These data items may include some or all of a presentation timestamp (110-1), a fingerprint (112-1), and a version (114-1). The presentation timestamp (110-1) may indicate a media time point at which this application archive is to be used by an application that is associated with the application archive (108-1), for example, for installation, upgrading, rendering or presentation. The fingerprint (112-1) may be a unique signature (or a unique digital manifest) that can be used as a search key and deterministically identify one among a plurality of application archives in an application archive cache as the application archive corresponding to the fingerprint. The fingerprint (112-1) may be computed based on a binary representation of the application archive (108-1). The version (114-1) may be used to indicate the freshness of the application archive. In some embodiments, the fingerprint (112-1) and the version (114-1) may be used in comparison with corresponding data items of another application archive, which for example may be located in the application archive cache, in order to determine whether the other application archive already in the application archive cache should be used. If that is the case, the media presentation system may directly use the other application archive already in the application archive cache or a corresponding reconstructed file system already in the media presentation system. In some embodiments, one or more additional data items may be defined and/or included as part of the application descriptor (118-1).

Figure 1D:
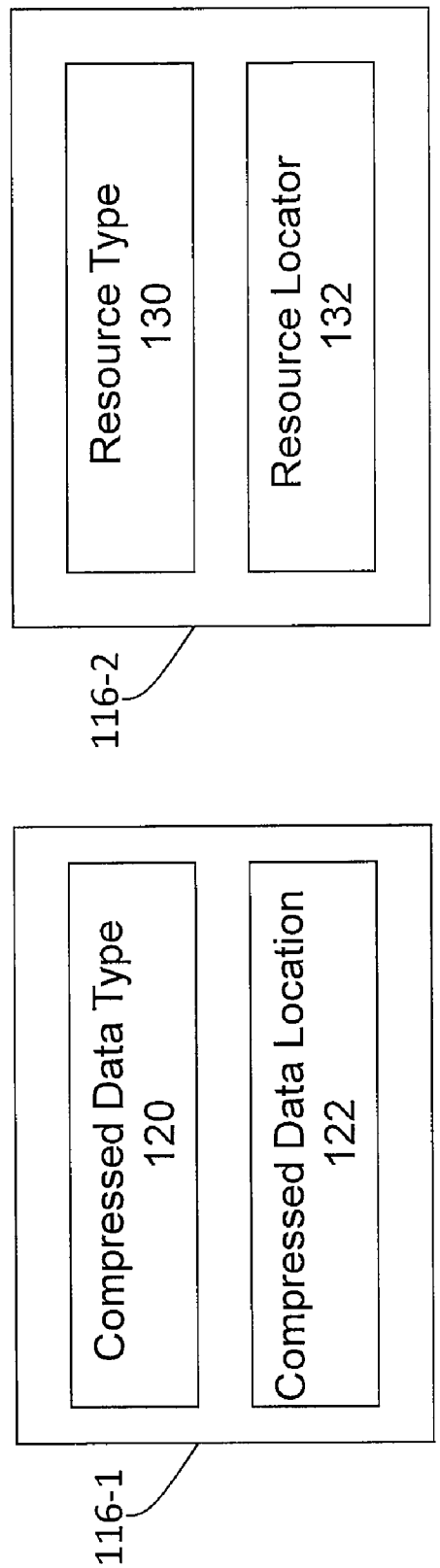

As previously noted, the set of sample data in the application archive (108-1) may comprise one or more sample data boxes such as a first sample data box (116-1) and a second sample data box (116-2). The sample data boxes may point to different sources for actual application data. In some embodiments, as illustrated in FIG. 1D, the first sample data box (116-1) may be of a type that points to a local source (e.g., the container (100)) for inline application data). On the other hand, the second sample data box (116-2) may be of a different type that points to either a local or remote source.

5. Application Data from a Local Source

For example, the first sample data box (116-1) may comprise data items such as a compressed data type (120) and a compressed data location (122). The compressed data type (120) may indicate that data referred to (or contained) by the sample data box (116-1) is in a Java archive (jar) file, or a ZIP file, or any of other compression file formats. The compressed data location (122) in the first sample data box (116-1) may point to a location where a data block contains compressed application data.

5.1. Application Data in JAR Files

In a possible embodiment, some or all of the application data, which may or may not comprise interactive applications, may be packaged in one or more files in Sun Microsystems' JAR file format. Applications may be based on standard Web technologies such as XHTML, CSS, AJAX and any other application data which is required for rendering by the media presentation system. The JAR files may be stored as a set of sample data in an application archive or a plurality of sets of sample data in a plurality of application archives.

In a possible embodiment in which the container (100) is a MP4 base media file, the following example structures may be used to identify an application track within the MP4 base media file:

---

A Handler Reference Data box (hdlr) with handler_type = 'jart'
A Media Information Data box (minf) comprising an Application Track header data box (athd) as follows:
aligned(8) class JarHeaderData box
   extends FullData box ('athd', version = 0, flags = 0) {
}
A Sample Description Data box (stsd) comprising an Application Track Sample
Description data box as follows:
aligned(8) class ApplicationTrackSampleEntry
   extends SampleEntry(codingname) {
}
Wherein codingname is a four-character code 'jart', indicating JAR data units.

---

In a possible embodiment, to ensure a reasonable loading time, JAR-based application data in an application archive may be limited to no more then 1 megabyte (MB) per JAR data unit. In the event that application data in an application archive exceeds this 1 MB limit, the application data may be fragmented.

5.2. Application Data in ZIP Files

In a possible embodiment, some or all of application data, which may or may not comprise interactive applications, may be packaged in one or more files in ZIP file format. The ZIP files may be stored as a set of sample data in an application archive or a plurality of sets of sample data in a plurality of application archives.

In a possible embodiment in which the container (100) is a MP4 base media file, the following example structures may be used to identify an application track within the MP4 base media file:

---

A Handler Reference Data box (hdlr) with handler_type = 'zipt'
A Media Information Data box (minf) comprising an Application Track header data box (athd) as follows:
aligned(8) class ZIPHeaderData box
   extends FullData box ('athd', version = 0, flags = 0) {
}
A Sample Description Data box (stsd) comprising an Application Track Sample
Description data box as follows:
aligned(8) class ApplicationTrackSampleEntry
   extends SampleEntry(codingname) {
}
Wherein codingname is a four-character code 'zipt', indicating ZIP data units.

---

In a possible embodiment, to ensure a reasonable loading time, ZIP-based application data in an application archive may be limited to no more then 1 megabyte (MB) per ZIP data unit. In the event that application data in an application archive exceeds this 1 MB limit, the application data may be fragmented.

6. Application Data as Accessible Resources

For the purpose of illustration, the second sample data box (116-2) may comprise data items such as a resource type (130) and a resource locator (132). The resource type (130) may indicate a type of resource such as a data format or a file format in which the application data, referred to by the second sample data box (116-2), is. The data format or file format may be any of a plurality of formats supported by the media presentation system. Thus, the data in that format may be correctly retrieved, extracted, or interpreted by the media presentation system. The resource location (132) in the second sample data box (116-2) may point to a location where the resource containing the application data can be retrieved. The location may be, but is not limited to, the same coded bitstream, the same system providing the coded bitstream, a remote application server, etc.

Whether contained in compressed files or accessible resources, a collection of application data, as contained or referred to in the set of sample data, may be retrieved by the media presentation system and may be used by the media presentation system to reconstruct a full file system that was used to create the application archive.

7. Applications Associated with Application Archives

In some embodiments, applications associated with application archives may have dependency relationships. For example, a first application (which in this relationship may be called a "dependent application") that is associated with the first application archive (108-1) may depend on a third application (which in this relationship may be called a "depended application") that is associated with the third application archive (108-3). As used herein, the term "depend on" means the dependent application may require the presence of the depended application in order for the former to perform to a full extent.

As used herein, an application archive may comprise data in an archive form or may comprise references to one or more data sources from which a file system or a part of a file system, associated with an application, may be retrieved and reconstructed. In some embodiments, the file system or the part of the file system reconstructed from the application archive or data sources, and availability (on the media presentation system) of applications on which the application depends, represents all that a media presentation system needs to render the application.

In a possible embodiment, an application that is associated with an application archive may be bundled inside a file system which can be retrieved and reconstructed from the application archive. To support the application (e.g., an Internet or Web application) bundled in the application archive, a complete directory of included assets (e.g., CSS, HTML, JavaScript, XML, etc.) for the application may be included in the same application archive or in the same container (102).

In a possible embodiment, an application that is associated with an application archive may already be present on the media presentation system before the application archive is retrieved from the coded bitstream. For example, an electronic book application may already be resident on the media presentation system as a part of, or in addition to, a resident media player. An application archive that is associated with the electronic book application may carry one or more electronic books that can be interpreted and rendered by the electronic book application. In some embodiments, the application archive may carry a version of electronic book application. However, the media presentation system may or may not extract data boxes containing the electronic book application from the container (102), and instead may use the resident copy of the electronic book application for the rendering of the books carried in the application archive.

As used herein, an application that is associated with an application archive in the container (100) may be application or operation system software to be installed on, firmware to upgrade, or an application running on the media presentation system. Thus, the term "to render" may mean to be executed, or to be used for installing or upgrading applications or operating system or firmware, or to be interpreted.

8. Application Rendering Sequence

Figure 1E:
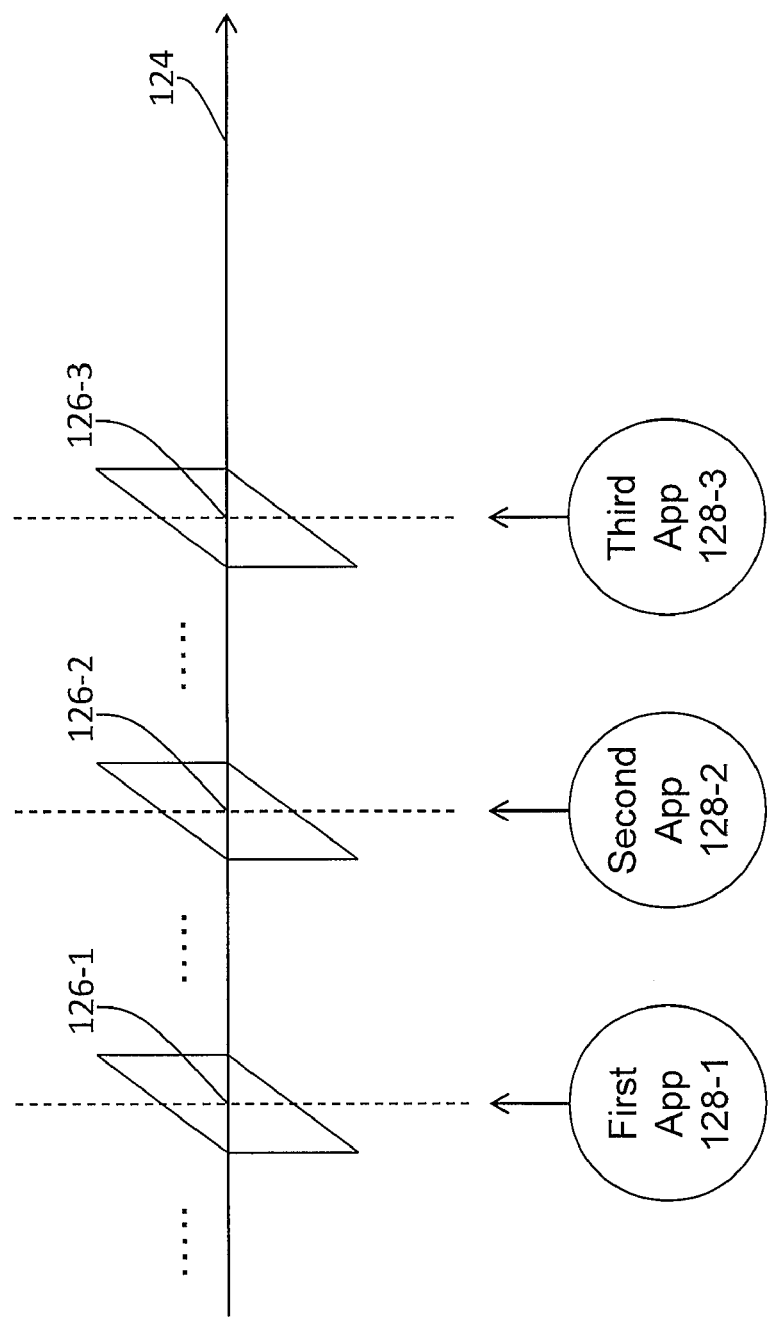

FIG. 1E illustrates an example application rendering sequence of applications in a possible embodiment of the invention. For the purpose of illustration, a first application (128-1), a second application (128-2), and a third application (128-3), are to be rendered along a media time direction (124). The first application (128-1) may be associated with the first application archive (108-1); the second application (128-2) may be associated with the second application archive (108-2); and the third application (128-3) may be associated with the third application archive (108-3).

In some embodiments, the first application (128-1) is to be rendered at a first media time point (126-1). In a possible embodiment, the first media time point (126-1) is indicated by the presentation timestamp (110-1) in the application descriptor (118-1). Similarly, the second application (128-2) and the third application (128-3) may be scheduled to be rendered at a second media time point (126-2) and a third media time point (126-3), respectively. These media time points may be indicated by their respective presentation timestamps in their respective application archives (e.g., 108-2 and 108-3).

In a possible embodiment, a special media time point, such as 0 and −1, may be used to signal that an application may be rendered outside the rendering of the media data in the coded bitstream.

9. Media Presentation System

Figure 2:
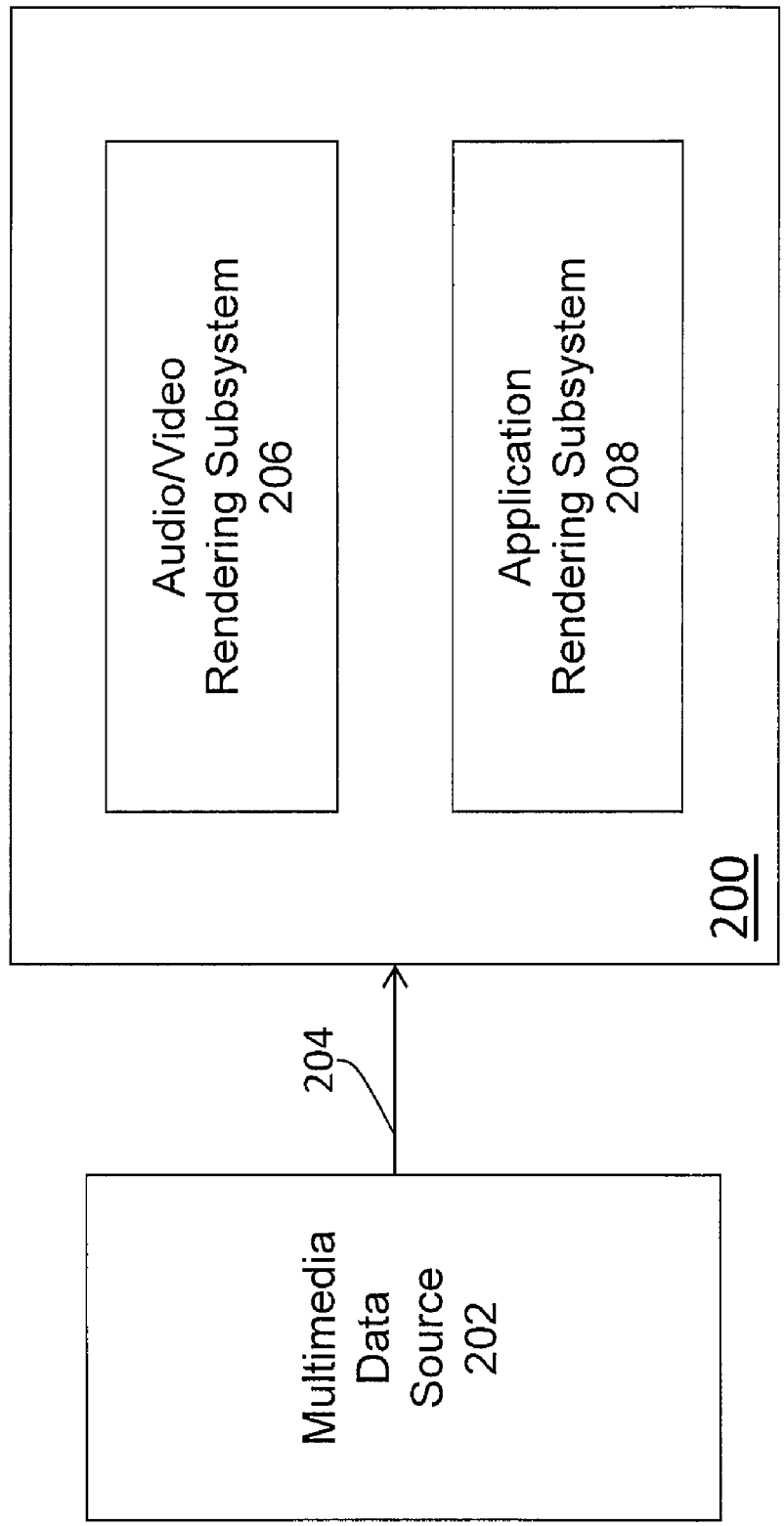
FIG. 2 illustrates an example media presentation system, according to possible embodiments of the present invention.

FIG. 2 illustrates an example media presentation system (200) in a possible embodiment of the invention. In a possible embodiment, the media presentation system (200) generally represents any hardware and/or software configured to receive a coded bitstream (204) from a multimedia data source (202), and to render media data and application data recoverable from the coded bitstream (204). In a possible embodiment, the coded bitstream (204) is received (or retrieved) by the media presentation system (200) through an intermediate media transmission or media storage system. For example, the coded bitstream (204) may be stored as one or more base media files on a Blu-ray disc or another suitable medium. The coded bitstream (204) may be recovered from a tangible storage medium and provided to the media processing system (200) as requested, as scheduled, or in any suitable manner.

In a possible embodiment, the coded bitstream (204) is a container (e.g., 100) that comprises video channels, metadata channel, audio channels, etc. The video channels and the audio channels collectively carry media data. The metadata in one or more separate metadata channels in the coded bitstream may comprise non-media data including application archives (e.g., 106) as described herein.

In a possible embodiment, the media presentation system (200) may comprise an audio/video rendering subsystem (206) and an application rendering subsystem (208).

In a possible embodiment, the audio/video rendering subsystem (206) generally represents any hardware and/or software configured to render the media data recovered from the coded bitstream (204). For example, the audio/video rendering subsystem (206) may be configured to recover an encoded version of image frames from the media data in the coded bitstream (204) and to generate a decoded version of image frames for displaying and rendering. Similarly, the audio/video rendering subsystem (206) may be configured to recover coded audio samples from the media data in the coded bitstream (204), and to generate sounds in one or more sound channels. Additionally and/or optionally, the audio/video rendering subsystem (206) may be configured to play the image frames and the sounds in synchronization, for example, based on PTSs either associated with or in the media data recovered from the coded bitstream (204).

In a possible embodiment, the application rendering subsystem (208) generally represents any hardware and/or software configured to render the application data recovered from the coded bitstream (204). For example, the application rendering subsystem (208) may be configured to recover an application archive (e.g., 108-1) from the application archives (106) in the coded bitstream (204) and to render an application that is associated with the application archive (108-1). The application may be, but not limited to, an interactive application. Additionally and/or optionally, the application rendering subsystem (208) may be configured to render the application in synchronization with the rendering of the media data by the audio/video rendering subsystem (206), for example, based on PTSs (one of which, for example, may be 110-1 in the application descriptor (118-1) of the application archive (108-1), as illustrated in FIG. 1C) in the application archive (108-1) and associated with the media data recovered from the coded bitstream (204).

10. Application Rendering Subsystem

Figure 3:
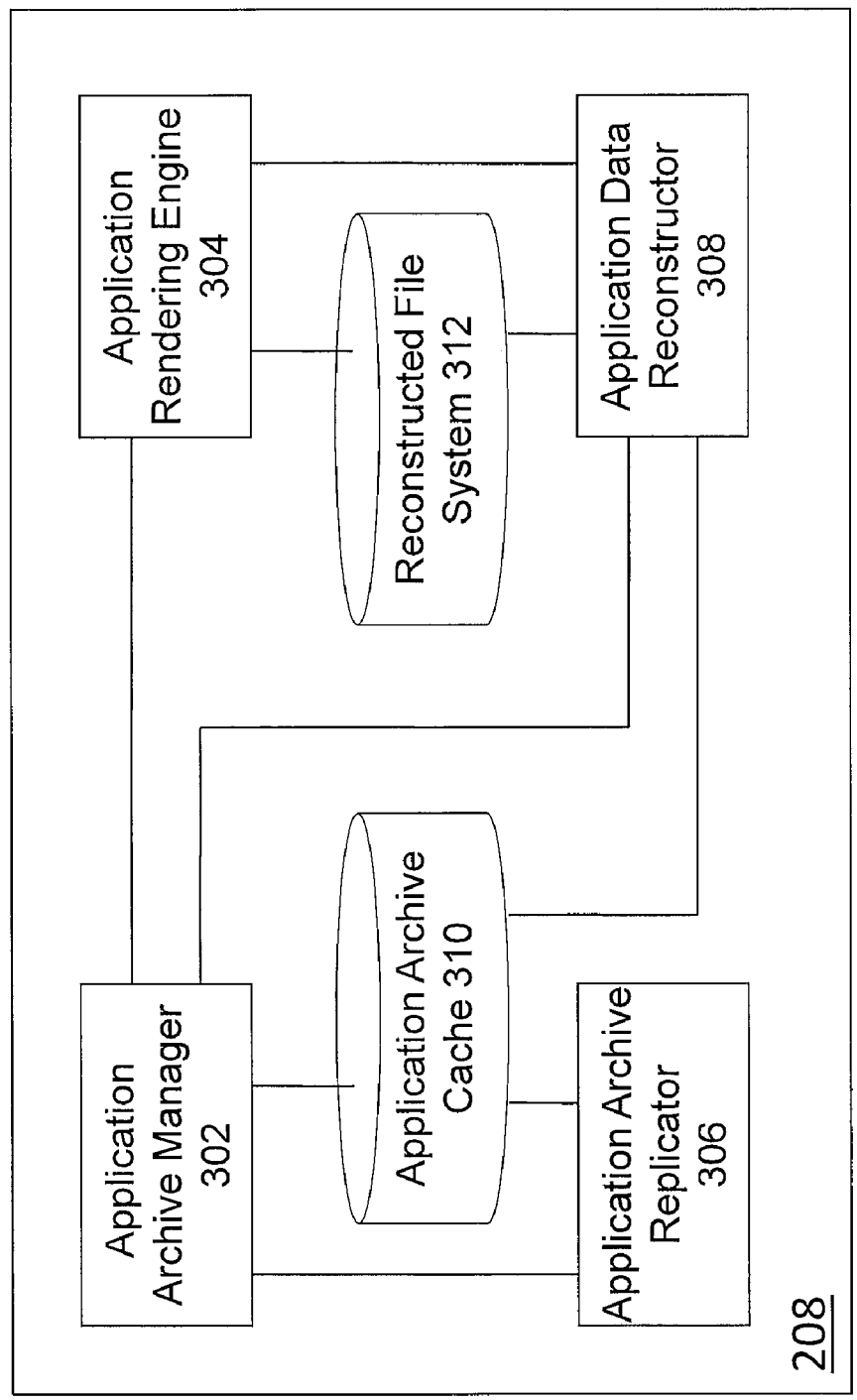
FIG. 3 illustrates an example application rendering subsystem, according to possible embodiments of the present invention.

FIG. 3 illustrates an example application rendering subsystem (e.g., 208) in a possible embodiment of the invention. In a possible embodiment, the application rendering subsystem (208) comprises an application archive manager (302), an application archive replicator (306), an application data reconstructor (308), and an application rendering engine (304), which are operatively linked to one another and to an application archive cache (310) and a reconstructed file system (312).

In a possible embodiment, the application archive manager (302) generally represents any hardware and/or software configured to extract an application descriptor related to an application archive in a coded bitstream, to determine whether a part or a whole of the application archive should be retrieved from sources external to the media presentation system (200), and if so, to retrieve and complete retrieving the part or the whole of the application archive from the external sources before a set media time point as indicated by a presentation timestamp in the application descriptor. In a possible embodiment, the media presentation system (200) may be configured to complete any such retrieving of the application archive a certain time period before the set media time point. This certain time period may be milliseconds to tens of seconds, a few minutes, tens of minutes, an hour, etc. The application archive manager (302) may be configured to extract an application descriptor from the coded bitstream without retrieving application data archived in the application archive. The application archive manager (302) may be configured to provide some or a whole of the application descriptor to other parts or units within the application rendering subsystem (208) or the media presentation system (200). In order to determine whether the application archive should be retrieved from the external sources, the application archive manager (302) may be configured to use a fingerprint in the application descriptor as a key to determine whether any application archive with the fingerprint exists in the application archive cache (310) and, if so, how fresh that application archive is, for example, based on version, build or expiration time information that may be included in the application descriptor. If the application archive manager (302) determines that such an application archive does not exist in the cache or if the cached application archive is outdated, the application archive manager (302) may proceed to retrieve the application archive from the external sources. The application archive manager (302) may be configured to provide some or a whole of the application archive to other parts or units within the application rendering subsystem (208) or the media presentation system (200). On the other hand, if the cached application archive exists and is fresh enough, the application archive manager (302) may refrain from retrieving the application archive from the external sources.

In a possible embodiment, the application archive cache (310) stores application archives that are retrieved from external sources. The application archive cache (310) may store an application archive at least until an expiration time if it is so indicated in an associated application descriptor. The application archive cache (310) may be implemented on a storage system with a certain storage capacity. A cache management algorithm such as least recently use may be implemented to remove application archives with low usage. The application archive cache (310) may store application archives that are derived from a plurality of coded bitstreams that have been received by the media presentation system (200). An application archive which one coded bitstream causes to be retrieved may be used to render an application associated with the application archive by the media presentation system (200), when media data of a different coded bitstream are being rendered.

In a possible embodiment, the reconstructed file system (312) may be a designated storage location for storing a set of file directories containing application data for one or more applications to be rendered by the media presentation system (200). In a possible embodiment, file directories created in the reconstructed file system (312) may exist only while the applications are being rendered. In another embodiment, the reconstructed file system (312) may keep the file directories for an extended time period. The extended time period may be configured by the media presentation system (200) based on system configuration or based on expiration time information in an application descriptor or based on a data retention policy implemented by the media presentation system (200). In some embodiments, a part or all of the reconstructed file system 312 may be permanent file directories on the media presentation system (200). For example, an application archive may contain application data to upgrade one of installed applications on the media presentation system (200) including the audio/video rendering subsystem (206).

In a possible embodiment, the application archive replicator (306) generally represents any hardware and/or software configured to receive an application archive and replicate the application archive in the application archive cache (310).

In a possible embodiment, the application data reconstructor (308) generally represents any hardware and/or software configured to reconstruct a file system on the media presentation system (200) to resemble an original file system that gives rise to an application archive. The original file system may be a set of file directories that comprise application data for an application that is associated with the application archive. In a possible embodiment in which the application archive is in a base media file that stores various pieces of data in data boxes. The application data reconstructor (308) may be configured to parse the structure of the base media file, to extract the data in the data boxes in the base media file, and to reconstruct the set of file directories with application data that may mirror the original file system that gives rise to the application archive. The application data reconstructor (308) may be configured to mount or install the set of file directories on the media presentation system (200) (e.g., in a host file system thereof). In a possible embodiment, some or all of the application archive may have been compressed, for example, by a lossless compression algorithm. In reconstructing the file system, the application data reconstructor (308) may be additionally and/or optionally configured to decompress compressed application data in the application archive based on an appropriate decompression algorithm.

In a possible embodiment, the application rendering engine (304) generally represents any hardware and/or software configured to render an application based on a reconstructed set of file directories containing application data for the application. The application rendering engine (304) may render the application to upgrade or install application or operating system software of the media presentation system (200), to upgrade firmware of the media presentation system (200), or to run an interactive application along with the rendering of the media data by the audio/video rendering subsystem (206). The application rendering engine (304) may render or execute the application at a set media time point as indicated by a presentation timestamp in an application descriptor of an application archive that is associated with the application. For example, the media data may be for a James Bond movie. As the movie is playing to the media time point as indicated by the presentation timestamp of the application descriptor, James Bond may be looking at his watch. At that media time point, the application rendering engine (304) may be configured to execute an interactive application that allows a viewer to learn more about the watch or even purchase a watch of the same kind. While the application may be of an arbitrary type, the application rendering engine (304) may be configured to render such an application in synchronization with the rendering of the media data.

11. Schedule Retrieving Application Archives

In a possible embodiment, the media presentation system (200) may be configured to extract all application descriptors in an container (e.g., 100), which may be a base media file in one of MP4, quicktime, avi, flash, etc., file formats. In a possible embodiment, the application descriptors may be extracted before playing the media data contained in the container. In a possible embodiment, the application descriptors may be extracted while playing the media data contained in the container. For example, the application descriptors may be retrieved in the beginning period of playing the media data. In some embodiments, this beginning period may be measured in terms of a fraction of second, seconds or minutes. Additionally and/or optionally, the application descriptors may be retrieved over an extended period of time.

In a possible embodiment, the media presentation system (200) may be configured to determine, based on the application descriptors in the container (100), a set of application archives that need to be retrieved from external sources, to determine dependency relationships between the application archives, and to coordinate the retrieving of the set of application archives so that an application archive and depended application archives, if any, are made available on the media presentation system (200) a certain time period before a set media time as indicated in a corresponding presentation timestamp.

In a possible embodiment, the media presentation system (200) may be configured to monitor system resource usages, to monitor dynamic changes to the system resource usages by user activities with respect to the rendering of the media data (e.g., pause, forward, rewind, stop, etc.), to predict periods of high system resource usages (e.g., scenes involving fast movements and actions) and low system resource usages (e.g., scenes not involving large amounts of video and audio data), and to schedule the retrieval of the set of application archives accordingly.

In a possible embodiment, the system resource usages may include, but are not limited to, hardware-based resource usages such as network bandwidth usage, buffer usage, RAM usage, CPU usage, disk usage, etc. The system resource usages may also include logical resources such as operating system data structures (e.g., file descriptors), operating system inter-process communication facilities (e.g., pipes, shared memory maps). The media presentation system (200) may make use of supported system calls to obtain information about the system resource usages.

In a possible embodiment, the media presentation system (200) monitors user activities, and may refrain from retrieving any application archive when a user is fast-forwarding the playing of the media data. Instead, the media presentation system (200) may perform such retrieving when the user is rewinding or pausing the playing of the media data.

In a possible embodiment, the system resource usages may extract metadata and statistical information from the coded bitstream to predict periods of high system resource usages. For example, the metadata and statistical information may inform that a scene with a wide range of colors, pixel value changes, etc., may occur at a certain time period. Similarly, the metadata and statistical information may inform that a scene with little change in its content may occur at a certain time period. The media presentation system (200) may refrain from retrieving any application archive during predicted peak system resource usages, and instead may schedule such retrieving during a relatively quite period.

In a possible embodiment, the media presentation system (200) may implement a throttling mechanism in retrieving application archives. For example, when one or more system resource usages reach certain thresholds, the media presentation system (200) may pause the retrieving of application archives. When the system resource usages are below the thresholds but still in an elevated usage state, the media presentation system (200) may perform the retrieving of application archives relatively slowly. When the system resource usages are in a low usage state, the media presentation system (200) may perform the retrieving of application archives relatively intensely. The thresholds and criteria for these states may be preset, dynamically changed, or configurable.

12. Additional and/or Optional Features

Some media presentation systems as described herein may have limited input buffers that may not be capable of storing the entire media file. To address these restrictions, video and audio tracks may be organized as interleaved chunks. The duration of samples stored in a chunk may be limited to one second, a fraction of second, or another small time duration. Within a video or audio track, chunks may be arranged in decoding time order, for example, within the media-data box "mdat" of an MP4 file.

In a possible embodiment, if a logical data item such as an application file carried by the coded bitstream is bigger than 1 Mbytes or another size threshold, the logical data item may be fragmented. In a possible embodiment in which the coded bitstream is an MP4 file, the fragmenting of a large data item may be implemented with suitable moov headers. The size of "moov" data box in the MP4 may be limited to 1 Mbytes or another size threshold. The size of "moov" data boxes may be limited to 300 kbytes or another size threshold. In this embodiment, a "moov" data box may be positioned before a corresponding "mdat" data box. For video tracks, random accessible samples may be stored as the first sample of a "traf". In a possible embodiment where gradual decoder refresh is supported, a random accessible sample and the corresponding recovery point may be stored in the same video fragment. For audio tracks, samples having the closest presentation time for a video random accessible sample may be stored as the first sample of a "traf". Hence, the first samples of video and audio in the "moov" have the approximately equal presentation times. In a possible embodiment, only a Media Data box (mdat) may be allowed to have size 1, and the last Media Data box (mdat) in the file may be allowed to have size 0, while all other data boxes may not have size 1.

Tracks other than the video and audio tracks may be stored elsewhere, instead of in the buffers. For example, some metadata may be stored or flushed to a disk storage location that may be accessed on the needed basis.

In some embodiments, the media presentation system (200) may be configured to render or execute one, two, or more applications that are associated with application archives specified in a coded bitstream. Additionally and/or optionally, the media presentation system (200) provides support for inter-application or inter-process communications between the concurrently executed applications.

In some embodiments, application archives may be directly used as file systems in their own rights. The media presentation system (200) may be configured to support such a compressed file system similar to a non-compressed file system. For example, the media presentation system (200) may be configured to support persistent (e.g., persistent across the booting of the media presentation system (200)) and ephemeral data storage (e.g., removal after media data has been rendered) of application data in the compressed file system. The media presentation system (200) may be configured to preserve and maintain the execution and presentation of assets within a compressed sample datum unit present in the media. The media presentation system (200) may be configured to provide higher-level system meta-data, timing, or other rendering and/or communication schemes for application archives and/or applications associated with the application archives.

13. Process Flow

FIG. 4 illustrates an example process flow according to a possible embodiment of the present invention. In some possible embodiments, one or more computing devices or components in a media presentation system (e.g., 200) may perform this process flow. In block 410, the media presentation system (200) extracts an application descriptor (e.g., 118-1) from a coded bitstream (e.g., 204). The coded bitstream (204) comprises media data (e.g., 102 and/or 104) to be played by the media presentation system (200). The application descriptor (118-1) identifies an application archive (e.g., 108-1) (i) that is retrievable by the media presentation system (200) from one or more sources and (ii) that is required by the media presentation system (200) at a set media time (e.g., 126-1) associated with the media data. As used herein, the term "set media time associated with media data" refers to a media time at which a particular part of the media data is to be played. For example, the set media time may, but is not limited to, be specified by a presentation timestamp of the beginning, the end, the middle, or some other media time of a scene in the media data (e.g., a movie).

In block 420, the media presentation system (200) causes, while playing the media data in the coded bitstream (204), retrieving all of the application archive (118-1) from the one or more sources before the set media time (126-1).

The one or more sources from which the application archive (118-1) may be retrieved may include, but is not limited to, the coded bitstream (204). In an example, the coded bitstream (204) is a Moving-Picture-Experts-Group 4 (MP4) file; the application descriptor (118-1) may be embedded in one or more MP4 metadata tracks that are separate from tracks that carry the media data. In an example, the coded bitstream (204) is a Moving-Picture-Experts-Groups 2 transport stream (MP2TS); the application descriptor (118-1)

may be embedded in one or more tracks that comprise packet identifiers (PIDs) and that are separate from one or more media data tracks that carry the media data. In an example, the coded bitstream (204) is a H.264 video elementary stream; the application descriptor (118-1) may be embedded in one or more Supplemental Enhancement Information (SEI) messages. Other types of media files or coded bitstream formats, for example, Quicktime, avi, and Flash, may also be used.

In a possible embodiment, the application descriptor (118-1) may be in a metadata channel in the coded bitstream (204), outside one or more media data channels that carry the media data. In a possible embodiment, the application descriptor (118-1) may be extracted before any portion of the media data in the coded bitstream (204) has been extracted. In a possible embodiment, the application descriptor (118-1) may be extracted after one or more portions of the media data in the coded bitstream (204) have been extracted.

In a possible embodiment, the application archive (108-1) may be used by an application (e.g., 128-1) (which, e.g., shows a commercial related to something appearing in a movie) that is to be started at the set time (126-1) by the media presentation system (200). This application (128-1) may or may not be interactive with a user. In a possible embodiment, the application archive (108-1) comprises an electronic book. In a possible embodiment, the application archive (108-1) comprises a part of operating system software to be installed by the media presentation system (200). In a possible embodiment, the application archive (108-1) comprises a part of firmware to upgrade the media presentation system (200).

In a possible embodiment, at least a portion of the application archive (108-1) is contained in a compressed data file, for example, as a Java archive (jar) or a ZIP file. In a possible embodiment, the media presentation system (200) may replicate an application archive such as 108-1 in an application archive cache (e.g., 310) on the media presentation system (200).

In a possible embodiment, the application archive (108-1) depends on another application archive (e.g., 108-3). The media presentation system (200) may make available the other application archive (108-3) on the media presentation system (200) before the set media time (128-1).

In a possible embodiment, a second application descriptor may also be extracted from the coded bitstream (204). The second application descriptor may identify a second application archive (e.g., 108-2) (i) that is retrievable by the media presentation system (200) from one or more second sources and (ii) that is required by the media presentation system (200) at a second set media time (e.g., 128-2) associated with the media data. The one or more second sources here may be, but are not limited to, the same as, or different, than the one or more sources as previously mentioned. The media presentation system (200) may determine whether the second application archive (108-2) is available in the application archive cache (310) on the media presentation system (200). As used herein, the term "available in a cache" may mean that an application archive exists in the cache and is not otherwise deemed as expired; whether an application archive is deemed as expired may depend on version, release information, application build time, or a cache management policy implemented relative to the cache.

In response to determining that the second application archive (108-2) is available in the application archive cache (310) on the media presentation system (200), the media presentation system (200) may refrain from retrieving, while the media presentation system (200) playing (e.g., rendering or displaying) the media data, any of the second application archive (108-2) from the one or more second sources. In an example, the second application archive (108-2) might have been replicated in the application archive cache (310) on the media presentation system (200) before a previous set media time specified in a previous application descriptor in the coded bitstream (204). In another example, the second application archive (108-2) might have been replicated in the application archive cache (310) on the media presentation system (200) before a different set media time specified in a different application descriptor in a different coded bitstream. Thus, the media presentation system (200) may directly use the second application archive (108-2) in the cache (310) or directly use a reconstructed file system (e.g., in 312) that was already reconstructed from the second application archive (108-2).

On the other hand, in response to determining that the second application archive (108-2) is not available in the application archive cache (310) on the media presentation system (200), the media presentation system (200) may cause, while playing the media data in the coded bitstream (204), retrieving all of the second application archive (108-2) from the one or more second sources before the second set media time (126-2).

In a possible embodiment, to retrieve all of the application archive (108-1) from the one or more sources before the set media time (126-1), the media presentation system (200) may retrieve one or more portions of the application archive (108-1) in a real time period during which bandwidth usage by the media presentation system (200) is not at maximum.

In a possible embodiment, one or more sources as described herein may include the coded bitstream and/or one or more application archive servers external to the coded bitstream.

14. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
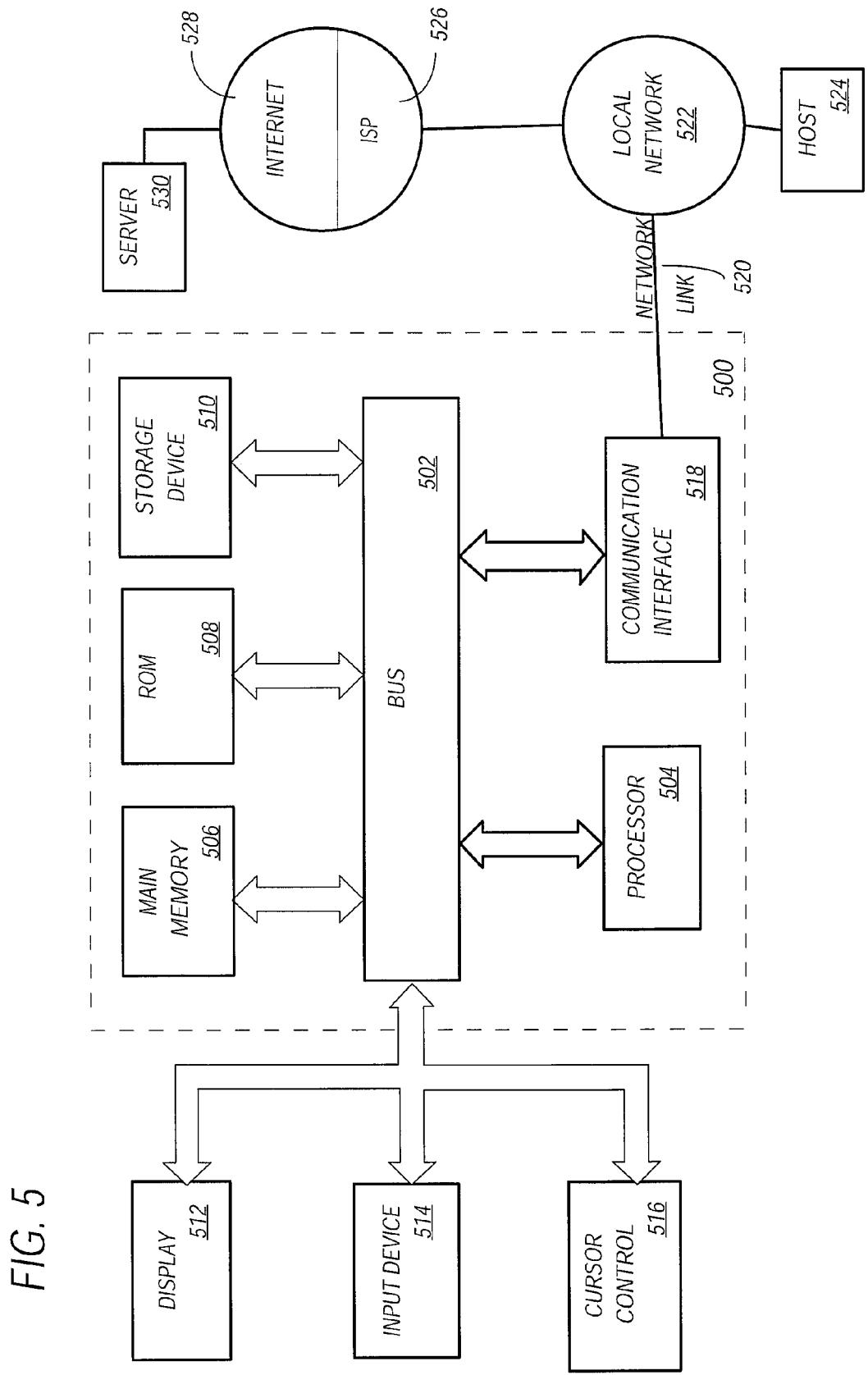
FIG. 5 illustrates an example hardware platform on which a computer or a computing device as described herein may be implemented, according a possible embodiment of the present invention.

For example, FIG. 5 is a block diagram that illustrates a computer system 500 upon which a possible embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

15. Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A method comprising:
   extracting an application descriptor from a coded bitstream, the coded bitstream comprising media data to be played by a media presentation system, the application descriptor identifying an application archive (i) that is retrievable by the media presentation system from one or more sources and (ii) that is required by the media presentation system at a set media time associated with the media data;

while the media presentation system is playing the media data, causing the media presentation system to finish retrieving all of the application archive from the one or more sources before the set media time;

wherein the method is performed by one or more devices comprising a processor; and wherein causing the media presentation system to retrieve all of the application archive from the one or more sources before the set media time includes retrieving one or more portions of the application archive in a real time period during which bandwidth usage by the media presentation system is not at maximum.

2. The method of claim 1, further comprising:

extracting a second application descriptor from the coded bitstream, the second application descriptor identifying a second application archive (i) that is retrievable by the media presentation system from one or more second sources and (ii) that is required by the media presentation system at a second set media time associated with the media data;

while the media presentation system is playing the media data, causing the media presentation system to finish retrieving the second application archive from the one or more sources before the second set media time.

3. The method of claim 1, further comprising replicating the application archive in an application archive cache on the media presentation system.

4. The method of claim 1, further comprising:

extracting a second application descriptor from the coded bitstream, the second application descriptor identifying a second application archive (i) that is retrievable by the media presentation system from one or more second sources and (ii) that is required by the media presentation system at a second set media time associated with the media data;

determining whether the second application archive is available in an application archive cache on the media presentation system; and in response to determining that the second application archive is available in the application archive cache on the media presentation system, refraining from causing the media presentation system to retrieve, while the media presentation system is playing the media data, any of the second application archive from the one or more second sources.

5. The method of claim 4, wherein the second application archive was replicated in the application archive cache on the media presentation system before a previous set media time specified in a previous application descriptor in the coded bitstream.

6. The method of claim 4, wherein the second application archive was replicated in the application archive cache on the media presentation system before a different set media time specified in a different application descriptor in a different coded bitstream.

7. The method of claim 1, wherein the one or more sources include the coded bitstream.

8. The method of claim 1, wherein the application descriptor is extracted before any portion of the media data in the coded bitstream has been extracted.

9. The method of claim 1, wherein the application descriptor is extracted after one or more portions of the media data in the coded bitstream have been extracted.

10. The method of claim 1, wherein the application descriptor is in a metadata channel in the coded bitstream and is outside one or more media data channels that carry the media data.

11. The method of claim 1, wherein the coded bitstream is a Moving-Picture-Experts-Group 4 (MP4) file and wherein the application descriptor is embedded in one or more MP4 metadata tracks that are separate from tracks that carry the media data.

12. The method of claim 1, wherein the coded bitstream is a Moving-Picture-Experts-Groups 2 transport stream (MP2TS) and wherein the application descriptor is embedded in one or more tracks that comprise packet identifiers (PIDs) and that are separate from one or more media data tracks that carry the media data.

13. The method of claim 1, wherein the coded bitstream is a H.264 video elementary stream and wherein the application descriptor is embedded in one or more Supplemental Enhancement Information (SEI) messages.

14. The method of claim 1, wherein at least a portion of the application archive is contained in a compressed data file.

15. The method of claim 14, wherein the compressed data file is a java archive (jar).

16. The method of claim 14, wherein the compressed data file is a ZIP file.

17. The method of claim 1, wherein the application archive is used by an application that is to be started at the set time by the media presentation system.

18. The method of claim 1, wherein the application archive comprises an electronic book.

19. The method of claim 1, wherein the application archive comprises a part of operating system software to be installed by the media presentation system.

20. The method of claim 1, wherein the application archive comprises a part of firmware to upgrade the media presentation system.

21. The method of claim 1, wherein the application archive depends on a second application archive, and wherein the method further comprising making available the second application archive on the media presentation system before the set media time.

22. An apparatus comprising a processor and configured to perform the method recited in claims 1.

23. A non-transitory computer readable storage medium, comprising software instructions, which when executed by one or more processors cause performance of the method recited in claim 1.

* * * * *